E. H. JONES.
MEANS FOR HOLDING ELECTRODES USED IN SOLDERING AND DEPOSITING METALS BY THE ELECTRIC ARC.
APPLICATION FILED FEB. 25, 1920.
1,438,497.
Patented Dec. 12, 1922.
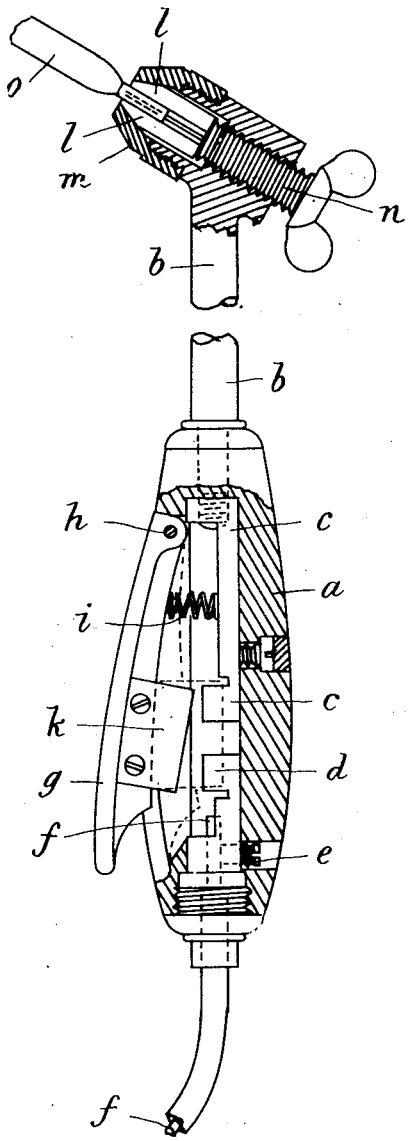
INVENTOR:
Ernest Henry Jones
By Wm Wallace White
ATT'Y Patented Dec. 12, 1922.

1,438,497

UNITED STATES PATENT OFFICE.

ERNEST HENRY JONES, OF LONDON, ENGLAND.

MEANS FOR HOLDING ELECTRODES USED IN SOLDERING AND DEPOSITING METALS BY THE ELECTRIC ARC.

Application filed February 25, 1920. Serial No. 361,189.

*To all whom it may concern:*

Be it known that I, ERNEST HENRY JONES, subject of the King of Great Britain, residing at 18 and 20 Church Street, Islington, London, England, have invented new and useful Improvements in Means for Holding Electrodes Used in Soldering and Depositing Metals by the Electric Arc, of which the following is a specification.

This invention has for its object improved means for holding electrodes used in soldering and depositing by the electric arc of the type in which an insulated handle or hand grip is fixed upon a metal stem capable of carrying the electric current, the upper end of the stem being provided with means for gripping the end of the metal electrode and the lower end being provided with a suitable joint or connection by which the current cable may be attached and electrically connected to the stem.

According to this invention the stem is provided with a gripping device in the nature of a drill chuck with compressible jaws arranged in a conical housing, and the handle or hand grip is provided with a simple form of switch by means of which the current may be cut off from the gripping device when fitting a new electrode or when the holder is not in use.

The accompanying drawing illustrates a holder constructed according to the invention.

$a$ is the handle or hand grip formed of an insulating material, and $b$ is a metal stem fixed to the handle $a$ and electrically connected to one part $c$ of a switch suitably secured in the handle. The other part $d$ of the switch is secured within the opposite end of the handle $a$ and is provided with a screw $e$ to grip the electric cable $f$ and provide electrical connection with the part $d$ of the switch. The handle $a$ is provided with an insulated switch lever $g$ pivoted to the handle at $h$ and provided with a throw-off spring $i$; the switch lever $g$ is also provided with a metal blade or bridge $k$ adapted to electrically connect the two parts $c$ and $d$ of the switch when the handle $a$ and lever $g$ are gripped in the hand. The upper end of the stem $b$ is provided with a gripping device which comprises conical gripping jaws $l$ mounted within a conical housing $m$ and a hand screw $n$ to thrust forward the jaws $l$ and cause them to grip the metal wire or rod of the electrode $o$. The gripping device is set at a suitable angle with respect to the stem.

I claim:—

1. An electrode holder comprising a metal stem, a chuck on said stem, an insulated handle fixed on said stem, a switch contact electrically connected to said stem and located within the handle, a second switch contact located in the handle and capable of electrical connection with a flexible cable, a switch blade fixed to an insulated switch lever capable of electrically connecting both contacts of said switch, a spring holding the switch blade away from the switch contacts, and means connecting the holder to an electric cable, as set forth.

2. An electrode holder comprising a metal stem, an insulated handle on one end of said stem, a chuck on the other end of said stem consisting of conical gripping jaws mounted within a conical housing and operated by a hand screw, a hand operated contact making device in the handle, and means electrically connecting the holder to an electric cable, as set forth.

In testimony whereof I have signed my name to this specification.

ERNEST HENRY JONES.